United States Patent [19]
Collier et al.

[11] Patent Number: 4,779,928
[45] Date of Patent: Oct. 25, 1988

[54] AUTOMOTIVE HEAD RESTRAINT

[75] Inventors: John Collier, Brantford; Leonard Neal, Windsor, both of Canada

[73] Assignee: Tamco Limited, Windsor, Canada

[21] Appl. No.: 92,405

[22] Filed: Sep. 1, 1987

[30] Foreign Application Priority Data

Sep. 9, 1986 [CA] Canada .................................. 517782

[51] Int. Cl.⁴ .............................................. A47C 1/10
[52] U.S. Cl. ...................................... 297/391; 297/408; 297/216
[58] Field of Search ................. 297/391, 410, 216, 408

[56] References Cited

U.S. PATENT DOCUMENTS

| | | | |
|---|---|---|---|
| 3,190,686 | 6/1965 | Smiler | 297/391 |
| 3,205,005 | 9/1965 | Brown | 297/397 |
| 3,223,447 | 12/1965 | Terracini | 297/397 |
| 3,794,382 | 2/1974 | Bloomfield et al. | 297/216 X |
| 4,527,834 | 7/1985 | Zyngier | 297/410 |
| 4,549,766 | 10/1985 | Nishino | 297/396 |
| 4,598,950 | 7/1986 | Fourrey | 297/216 X |

FOREIGN PATENT DOCUMENTS

| | | | |
|---|---|---|---|
| 826463 | 11/1969 | Canada . | |
| 1039639 | 10/1978 | Canada . | |
| 2204627 | 8/1973 | Fed. Rep. of Germany | 297/391 |
| 2839015 | 3/1980 | Fed. Rep. of Germany | 297/391 |
| 1009546 | 11/1965 | United Kingdom | 297/216 |

Primary Examiner—James T. McCall
Attorney, Agent, or Firm—Browdy and Neimark

[57] ABSTRACT

A head restraint for a vehicle seat is disclosed. The restraint comprises a support member for insertion into the vehicle seat and a shock absorbing assembly secured to the upper end of the support member and which comprises a wire lattice form having vertical and horizontal members defining the height, width and depth of said assembly and being welded to the support member at points of contact therewith. An elesticized foam padding is positioned over the lattice form.

10 Claims, 11 Drawing Sheets

AUTOMOTIVE HEAD RESTRAINT

FIELD OF THE INVENTION

This invention relates to head restraints and specifically to a head restraint for use in an automotive vehicle.

BACKGROUND OF THE INVENTION

Head rests or head restraints for automobiles have been in use for some time. However, conventional head rests often fail to provide optimum restraint for the head and upper neck of an occupant of a vehicle when the vehicle is involved in a collision. In such situations, especially when the vehicle in which occupant is riding is hit from behind, it is important that the head restraint be constructed so as to absorb and diffuse the shock of the collision as it is transmitted from the occupants head to the restraint as well as to support the head of the occupant to prevent neck injury.

SUMMARY OF THE INVENTION

The present invention provides a head restraint assembly of improved construction and performance when compared to the conventional automotive head rest and which, by virtue of its construction, can provide improved support and resiliency. Since the head restraint of the present invention has a main support member which is similar to that of conventional head restraint construction, it will fit in the openings already provided in the back rest of an automotive seat.

According to a broad aspect, the invention relates to a head restraint for a vehicle seat comprising a support member for insertion into the vehicle seat and a shock absorbing assembly secured to the upper end of the support member and comprising a wire lattice form having vertical and horizontal members defining the height, width and depth of the assembly and being welded to the support member at points of contact therewith and an elasticized foam padding over the lattice form.

The head restraint assembly according to the invention attempts to provide improved accommodation of impact loads resulting from a rear end collison where the vehicle occupants head snaps back into the elastic foam of the restraint and then to the dispersed wire lattice which has, by virtue of its design, an elastic or shock absorbing ability.

BRIEF DESCRIPTION OF THE DRAWINGS

The invention is illustrated by way of example in the accompanying drawings in which.

DESCRIPTION OF THE PREFERRED EMBODIMENT

Figure 1:
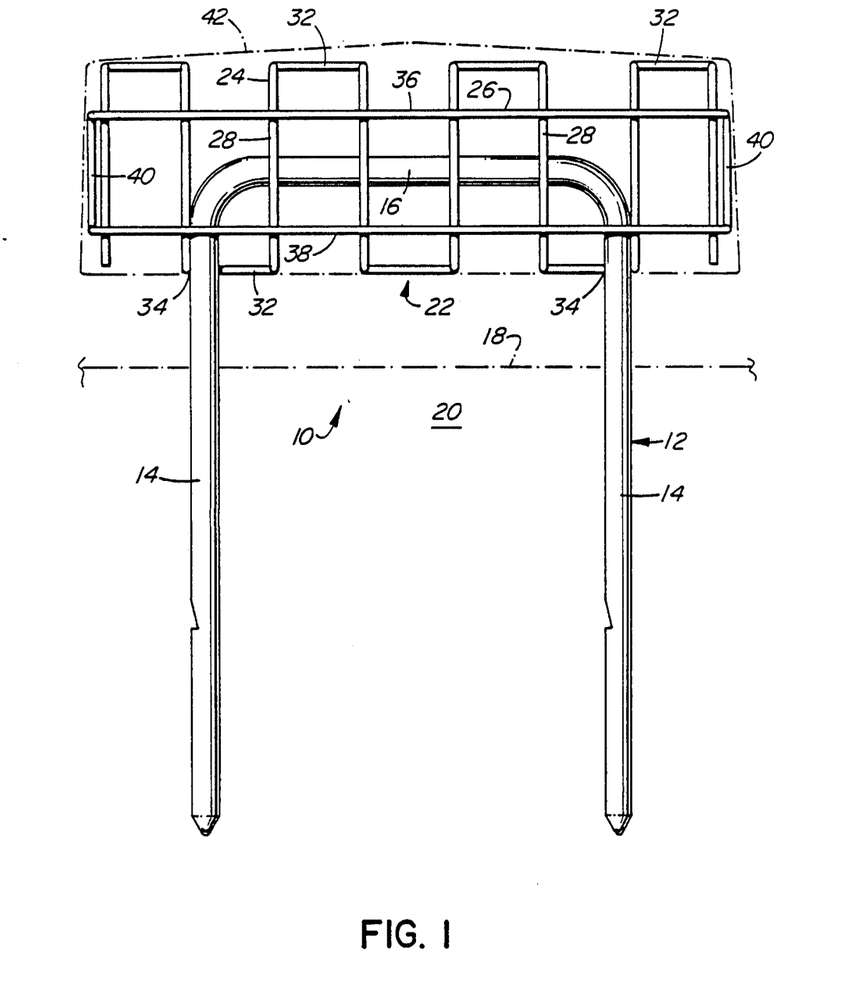
FIG. 1 is a front view of the head restraint assembly according to the present invention.
Figure 2:
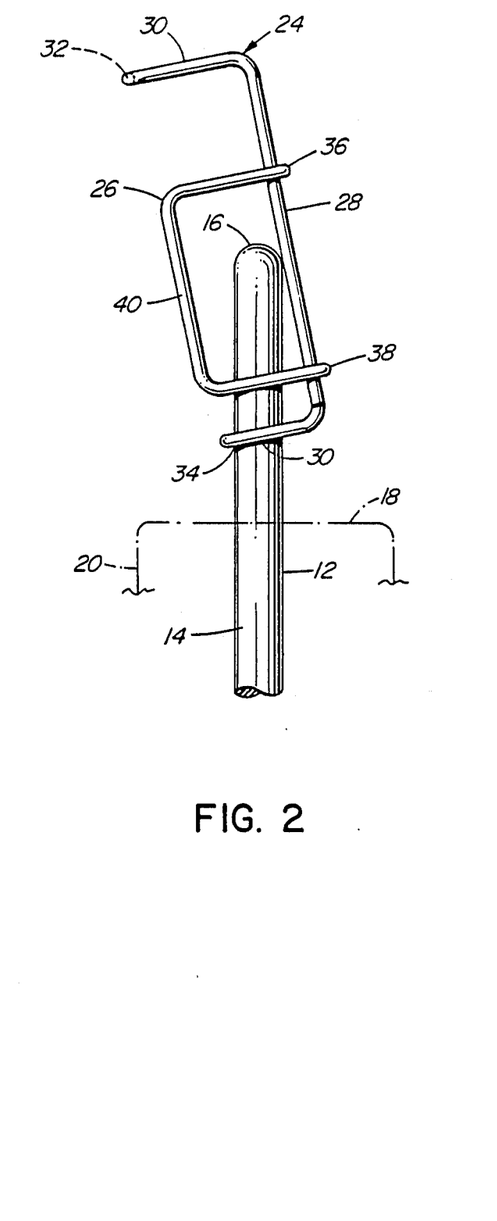
FIG. 2 is a side view of the assembly shown in FIG. 1.
Figure 3:
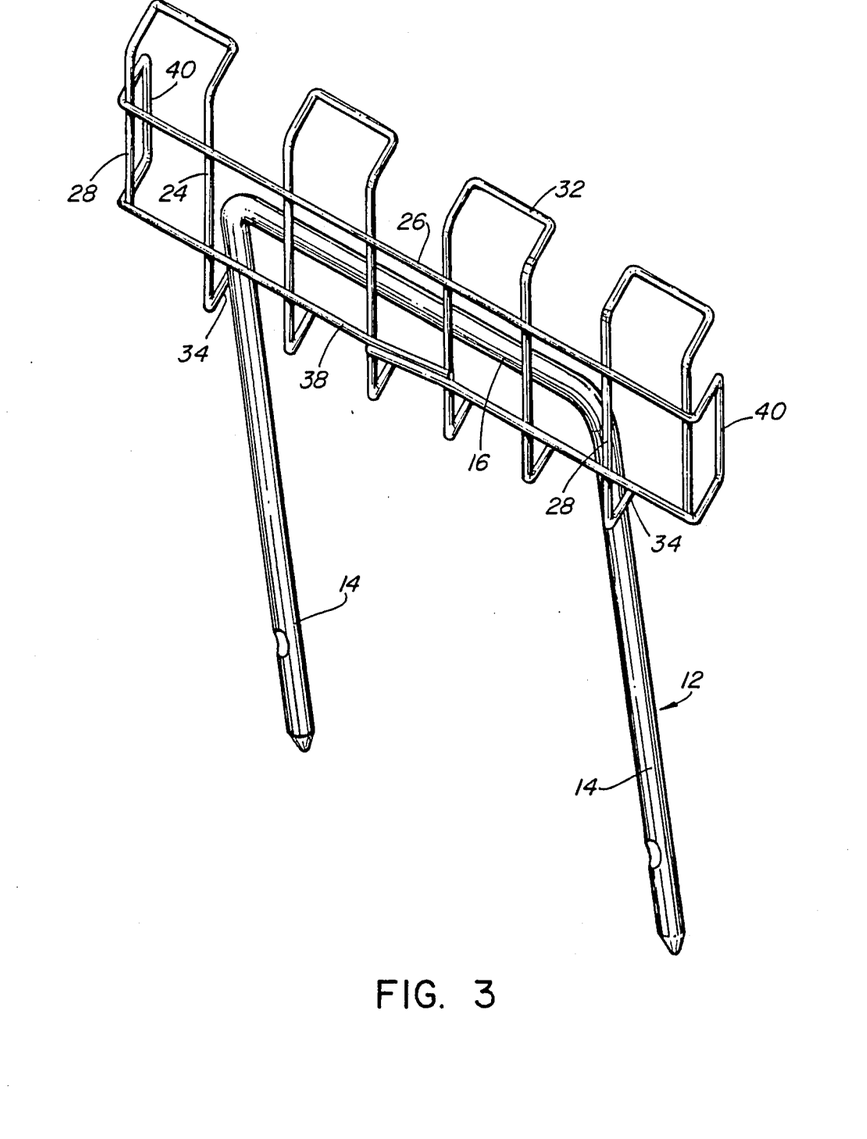
FIG. 3 is an isometric view of the assembly of FIG. 1.

Referring to FIGS. 1–3, a head restraint assembly indicated generally at 10 comprises a U-shaped support member 12 having a pair of parallel legs 14 and a cross bar 16. Support member 12 is adapted to be inserted in the upper end 18 of a back rest 20 of an automotive seat (shown in phantom line) in the same manner as a convention head rest. The support rod 12 is vertically adjustable within the back rest 20 so as to allow the proper vertical positioning of the head restraint assembly 10 with respect to the occupant's head. A wire lattice or framework 22 is made up from two basic wire members, 24 and 26. Wire member 24 extends lengthwise across the top of the support member 12 and comprises a series of spaced, parallel, vertical members 28 interconnected by rearwardly extending members 30 (FIG. 2) and short cross members 32. The length of the members 30 determine the depth of the head restraint framework and the length of the members 28, the height.

Selected cross members 32 are welded as at 34 to the support member 12 at points of contact therewith and vertical members 28 can selectively be similarly secured at their points of contact with the member 12.

Wire member 26 comprises two elongated parallel members 36 and 38 which extend across the front of the wire member 24 and are welded thereto at points of contact. The ends of member 26 terminate in rearwardly extending U-shaped members 40 which serve to define the ends of the head restraint assembly.

The wire form 22 is subsequently covered by a layer of suitable cushioning meaterial 42, FIG. 1, which provides support and resiliency to the head restraint assembly.

Figure 4:
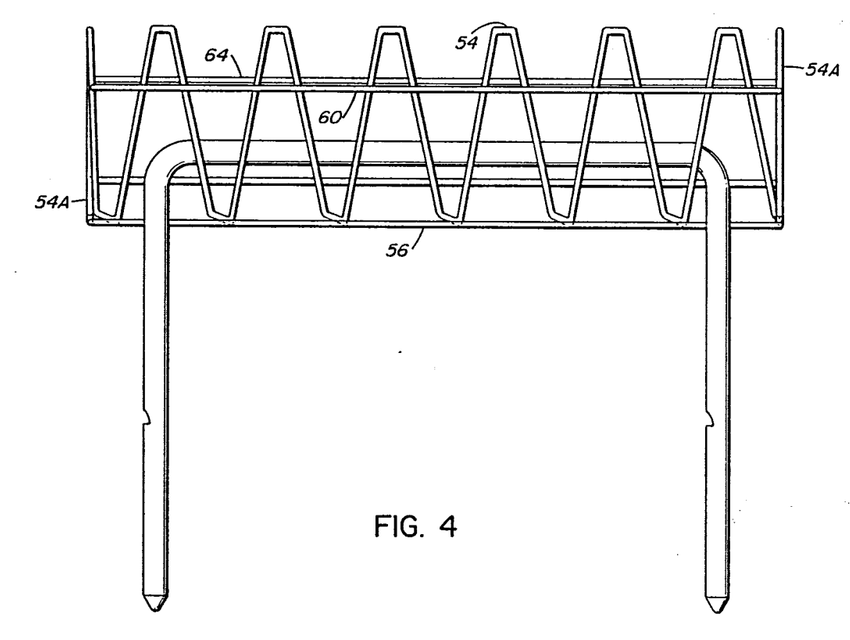
FIG. 4 is a front view of a further embodiment of the invention.
Figure 5:
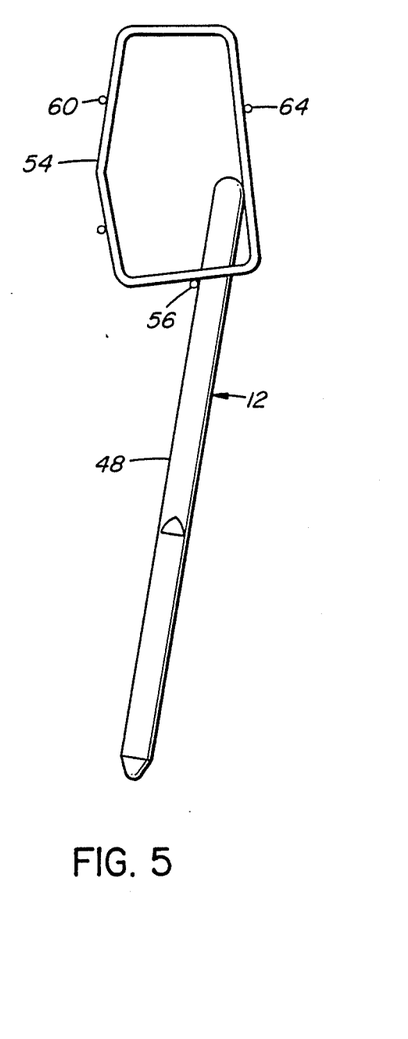
FIG. 5 is an end view of the assembly shown in FIG. 4.
Figure 6:
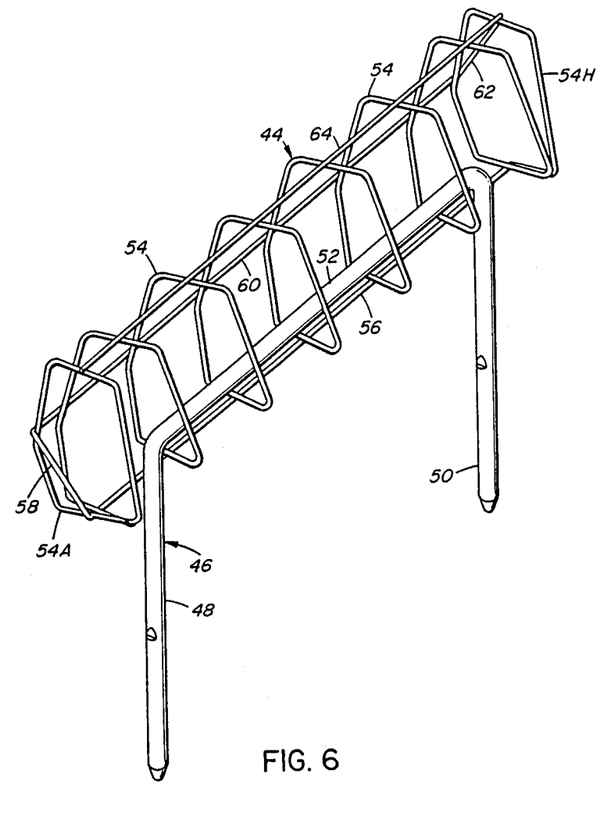
FIG. 6 is an isometric view of the assembly shown in FIG. 4.

Turning now to the embodiment of FIGS. 4, 5 and 6, a further embodiment of the invention is shown and, like the first embodiment, a wire form indicated generally at 44 is welded to a U-shaped support member 46 having dependent legs 48 and 50 and a cross bar 52. In this embodiment, the wire form is made up of a single wire formed into a plurality of coils 54 beginning for example with a first coil 54a and ending across the length of the structure in coil 54h. As indicated, at the end of that coil, the single wire is formed into a zig-zag pattern which extends acros the coils at various points of contact. Initially, the wire member 56 is the first run of the zig-zag and extends along the bottom of the coil members, then a right angle portion 58 becomes a first end member before turning into another longitudinal member 60 running across the front of the coil members and finally it takes another right angle into end portion 62 before turning into the last and uppermost longitudinal member 64 terminating at the upper end of the first coil 54a.

The coil members and zig-zag longitudinal members maybe welded to one another at numerous points of contact.

As shown in FIGS. 4 and 5, the upper run 64 of the zig-zag wire portion can be relocated to extend across the rear portion of the coils 54 rather across the top portions as illustrated in FIG. 6.

Figure 7:
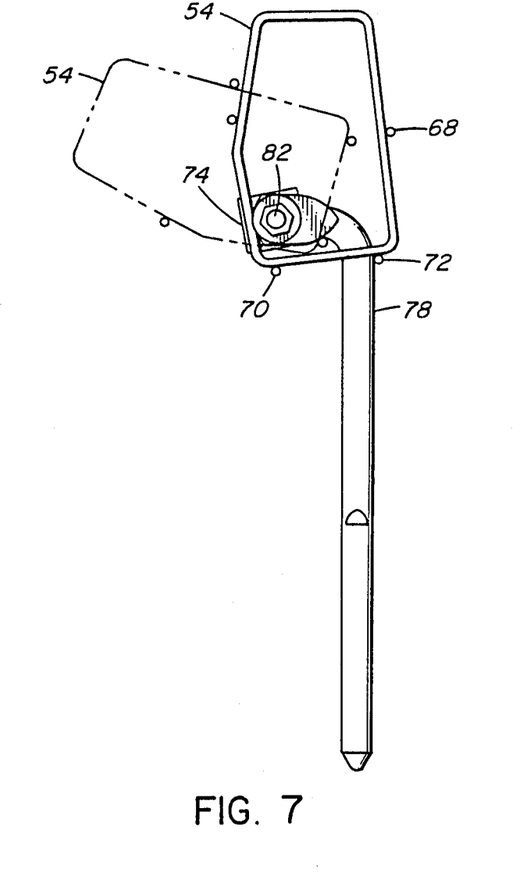
FIG. 7 is an end view of a still further embodiment of the invention.
Figure 8:
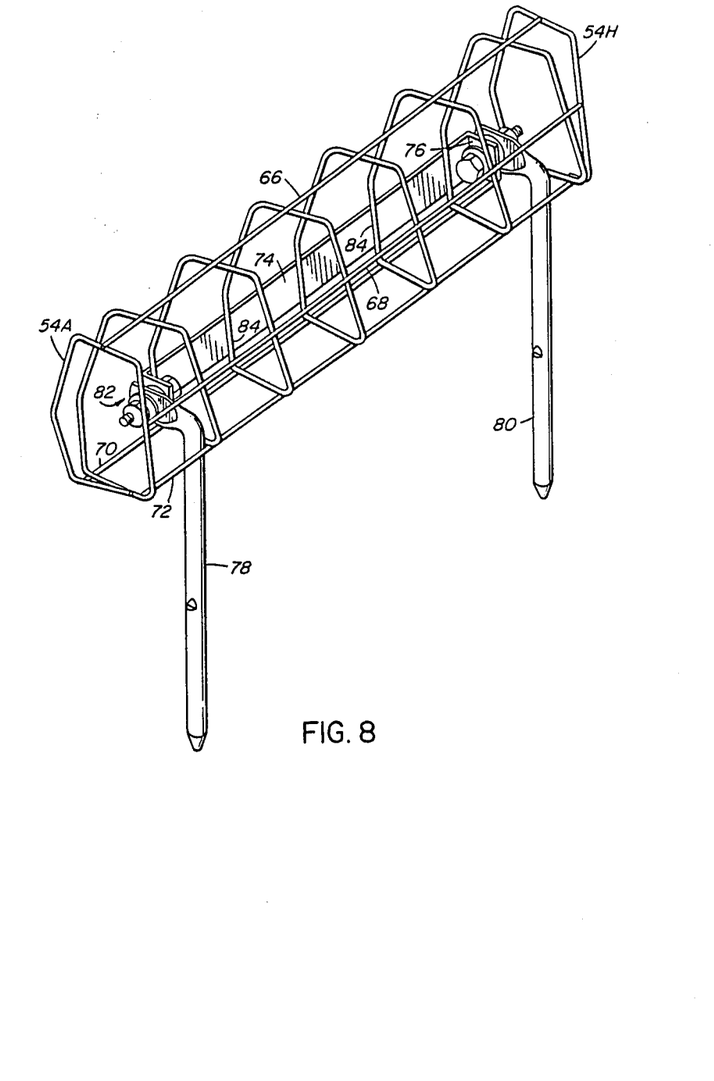
FIG. 8 is an isometric view of the embodiment of FIG. 7.

The embodiments shown in FIGS. 7 and 8 has basically the same wire form structure as the previous embodiment of FIGS. 4 through 6 including the coils 54a to 54h but the zig-zag cross wire portions are replaced by individual wire members such as an upper wire 66, rear wire 68 and lower front and rear wires 70 and 72 respectively. The one piece, U-shaped support member of the earlier embodiments is replaced by a U-shaped support member having a pivotal cross bar 74 having right-angled end portions 76 which serve to pivotally attach the cross bar 74 to the upper ends of individual support legs 78 and 80. Suitable bolts 82 (FIG. 7) incorporating frictional clutch surfaces, not shown, serve to connect the end member 76 of the cross bar to the upper ends of the support legs and to provide sufficient frictional engagement between the cross bar and the upper ends of the legs to allow the head restraint to be positioned and remain at a desired angle other than the near vertical. This is shown in phantom line in FIG. 7. In this embodiment, the front, downwardly dependent legs 84 of the individual pentagonal coils 54 are welded to the inner surface of the cross bar 74 along their points of contact.

Figure 9:
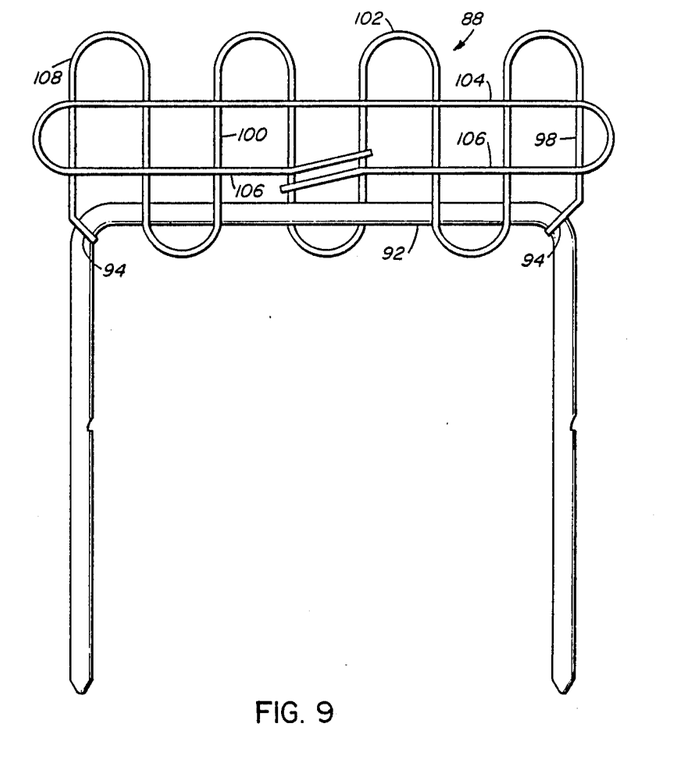
FIGS. 9 through 12 inclusive are front, top, end and isometric views respectively of a still further embodiment of the invention.
Figure 10:
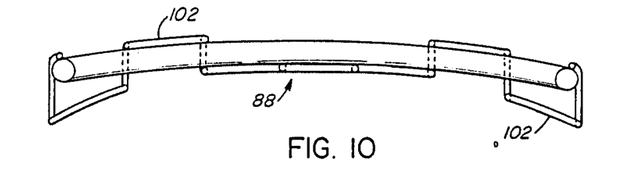
Figure 11:
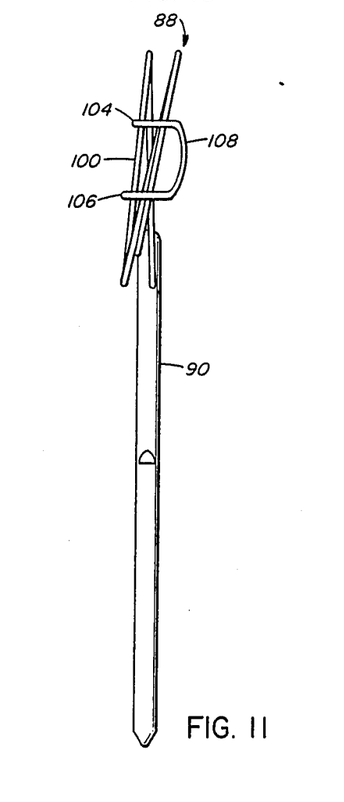

Turning to the embodiment shown in FIGS. 9 through 12, it will be seen that the wire form 88 has a generally concave configuration when viewed from the top as shown in FIG. 10. The support member 90 also has a gently curved top portion 92 to which the wire form 88 is welded as at 94 or 96.

The form 88 is made up of two wire members, one member 98 having a series of generally vertically oriented, convoluted portions with spaced vertical members 100 joined at their ends by loop portions 102.

Figure 12:
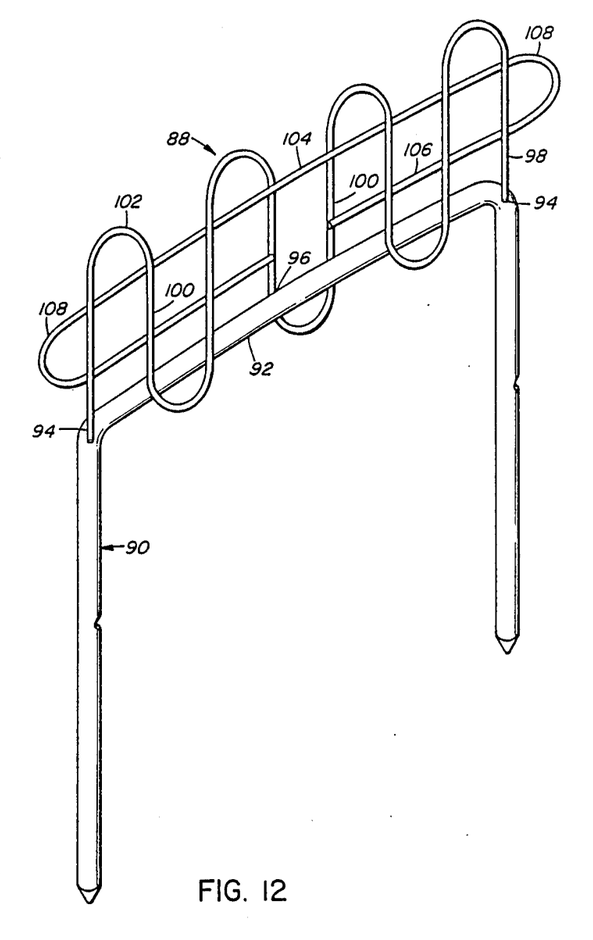

The second member of the form is a generally horizontal member comprising spaced, longitudinal portions 104 and 106 joined at their ends by loops 108. The terminal ends of the wire member 98 can be attached or welded at 94 as shown in FIG. 12 to the support member 90 or those ends can be angled inwardly (depending on the width of the form 88) and welded as shown in FIG. 9.

While the present invention has been described in connection with a specific embodiment thereof and in a specific use, various modifications will occur to those skilled in the art without departing from the spirit and scope of the invention as set forth in the appended claims.

The terms and expressions used in this specification are used as terms of description and not of limitation and there is no intention in the use of such terms and expressions to exclude any equivalents of the features shown and described or portions thereof but is recognized that various modifications are possible within the scope of the invention claimed.

The embodiments of the invention in which an exclusive property or privilege is claimed are defined as follows:

1. A head restraint for a vehicle seat of the type including a support member for insertion into the upper end of the vehicle seat, a shock absorbing assembly secured to the upper end of said support member, said assembly comprising a wire lattice form having members thereof defining the height, width and depth of said assembly and being welded to said support member at points of contact therewith, said assembly being adapted to receive elasticized foam padding over said lattice form.

2. A head restraint assembly according to claim 1 wherein said wire lattice form comprises spaced vertical members interconnected with end portions and extending across the width of said support member; and a pair of spaced, horizontal members extending across the vertical members and welded thereto at points of contact therewith.

3. A head restraint according to claim 1 wherein said wire form comprises a plurality of pentagonal coils looped about said support member and welded thereto at points of contact and a plurality of spaced, longitudinal members engaging said coils and being selectively secured thereto.

4. A head restraint according to claim 3 wherein said wire form comprises a single wire member.

5. A head restraint according to claim 3 wherein said support member comprises a pair of spaced legs and a cross bar pivotally secured to the upper ends of said legs, the coils of said wire form being welded to said cross bar whereby said wire form assembly can pivot with respect to said support member.

6. A head restraint according to claim 1 wherein said wire form extends across the width of said support member in a concave configuration, said form comprising a first member having a convoluted form with spaced vertical members interconnected by end members alternately located at the front and back surfaces of the cross bar of said support member and a pair of horizontal members spaced across and secured to said vertical members.

7. A head restraint for the back of an automotive vehicle seat, comprising a support member of generally inverted U-shaped configuration having a top part and two downwardly depending legs for insertion into the upper end of a vehicle seat back rest, shock-absorbing means for absorbing and diffusing shock secured to the top part of said support member, said shock-absorbing means comprising a three-dimensional wire lattice form configured to define the height, width and depth of said shock-absorbing means and being welded to said support member at points of contact therewith, and an elasticized foam padding substantially entirely covering said lattic form.

8. A head restraint according to claim 7, wherein said wire lattice form comprises a single wire member bent to define said height, width and depth of said shock-absorbing means.

9. A head restraint according to claim 6, wherein said wire lattice form has a depth substantially greater than the thickness of said support member.

10. A head restraint according to claim 7, wherein said wire lattice comprises a series of at least several loops extending across the width thereof.

* * * * *